United States Patent [19]

Adamko

[11] 4,058,892
[45] Nov. 22, 1977

[54] FOOD DECORATING INSTRUMENT

[75] Inventor: Edward W. Adamko, Brooklyn, N.Y.

[73] Assignee: The Raymond Lee Organization, Inc., New York, N.Y. ; a part interest

[21] Appl. No.: 737,592

[22] Filed: Nov. 1, 1976

[51] Int. Cl.$^2$ ............................................ B26B 17/04
[52] U.S. Cl. ...................................................... 30/178
[58] Field of Search ................. 30/178, 229, 363, 177, 30/186, 191, 193

[56] References Cited

U.S. PATENT DOCUMENTS

| | | | |
|---|---|---|---|
| 1,146,610 | 7/1915 | Altman | 30/178 X |
| 1,206,323 | 11/1916 | Harper | 30/178 X |

Primary Examiner—Jimmy C. Peters
Attorney, Agent, or Firm—Daniel Jay Tick

[57] ABSTRACT

A food decorating instrument for cutting pieces of fruit, vegetables, and the like, in a predetermined pattern, comprises first and second arms pivotally affixed to each other by a pivot pin in the manner of a pair of pliers. Each of the arms has a jaw end in the area of the pivot pin and a handle end spaced from the pivot pin. A spring mounted on the arms urges the jaw ends of the arms apart. An internally threaded bore is formed in the jaw end of the first arm. A plate-like member is affixed to the jaw end of the second arm. A mold member is removably threaded to the jaw end of the first arm via the bore thereof so that when a slice of fruit, vegetable, and the like, is interposed between the jaw ends and manual pressure is applied to force the jaw ends together, the cutting edge of the mold member cuts out a piece thereof in the predetermined pattern.

1 Claim, 8 Drawing Figures

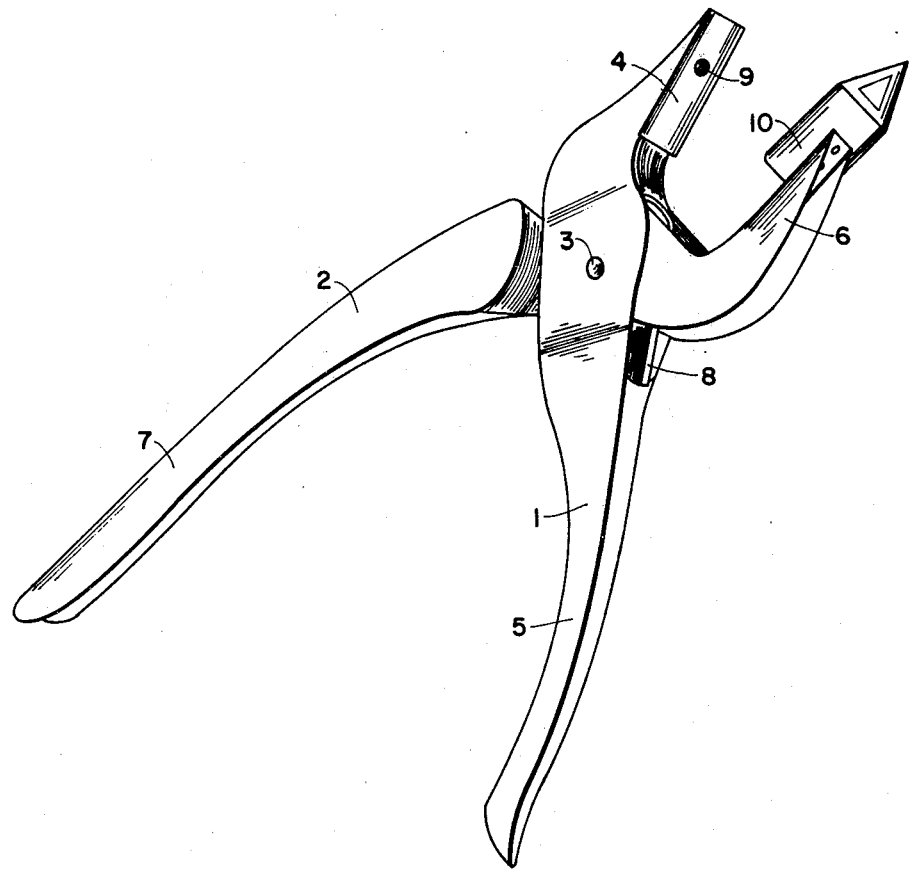

United States Patent Office

PTO - BOYERS, PA Duty Station

MISSING PAGE TEMPORARY NOTICE

PATENT # 4058892         FOR ISSUE DATE 11-22-1977

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

Drawing figures 1 thru 8

Data Conversion Operation
Boyers, Pa

FOOD DECORATING INSTRUMENT

BACKGROUND OF THE INVENTION

The present invention relates to a food decorating instrument. More particularly, the invention relates to a food decorating instrument for cutting pieces of fruit, vegetables, and the like, in a predetermined pattern.

Objects of the invention are to provide a food decorating instrument of simple structure, which is inexpensive in manufacture, used with facility and convenience, and functions efficiently, effectively and reliably to cut a piece of fruit, vegetable, and the like, in a predetermined pattern.

BRIEF DESCRIPTION OF THE DRAWINGS

In order that the invention may be readily carried into effect, it will now be described with reference to the accompanying drawings, wherein:

FIG. 1 is a perspective view of an embodiment of the food decorating instrument of the invention, without the mold member thereof;

FIG. 2 is a side view of an embodiment of the mold member of the food decorating instrument of the invention;

FIG. 3 is a view, taken along the lines III—III, of FIG. 2;

FIG. 4 is a side view of another embodiment of the mold member of the food decorating instrument of the invention;

FIG. 5 is a view, taken along the lines V—V, of FIG. 4;

FIG. 6 is a side view of still another embodiment of the mold member of the food decorating instrument of the invention;

FIG. 7 is a view, taken along the lines VII—VII, of FIG. 6; and

FIG. 8 is a cross-sectional view of part of a mold member of the food decorating instrument of the invention.

DETAILED DESCRIPTION OF THE INVENTION

The food decorating instrument of the invention functions to cut pieces of fruit, vegetables, and the like, in a predetermined pattern.

The food decorating instrument of the invention comprises first and second arms 1 and 2 pivotally affixed to each other by a pivot pin 3 in the manner of a pair of pliers, as shown in FIG. 1. Each of the arms has a jaw end in the area of the pivot pin and a handle end spaced from the pivot pin. Thus, as shown in FIG. 1, the first arm 1 has a jaw end 4 in the area of the pivot pin 3 and a handle end 5 spaced from said pivot pin, and the second arm 2 has a jaw end 6 in the area of said pivot pin and a handle end 7 spaced from said pivot pin.

A spring 8 is mounted on the arms 1 and 2 and urges the jaw ends 4 and 6 of the first and second arms 1 and 2 apart (FIG. 1).

An internally threaded bore 9 (FIG. 1) is formed in the jaw end 4 of the first arm 1.

A plate-like member 10 is affixed to the jaw end 6 of the second arm 2, as shown in FIG. 1.

In accordance with the invention, a mold member has a base plate 11 (FIGS. 2 to 8) with spaced opposite surfaces 12 and 13 (FIGS. 2, 4, 6 and 8). An externally threaded pin 14 extends substantially perpendicularly from the surface 12 of the base plate 11, as shown in FIGS. 2, 4, 6 and 8.

A cutting edge having a predetermined pattern of any desired type extends substantially perpendicularly from the opposite surface 13 of the base plate 11. In the embodiment of FIGS. 2 and 3, as shown therein, the cutting edge 15 has the configuration of a triangle.

In the embodiment of FIGS. 4 and 5, as shown therein, the cutting edge 16 has the configuration of a fluted semicircle.

In the embodiment of FIGS. 6 and 7, the cutting edge 17 has the configuration of a fluted semicircle of different dimensions from that of the embodiment of FIGS. 4 and 5.

When the mold member is removably affixed to the first arm by removably threadedly coupling the pin 14 thereof in the bore 9 of the jaw end 4 of the first arm 1, and a slice of fruit, vegetable, and the like, is interposed between the jaw ends 4 and 6, and manual pressure is applied to the handle ends 5 and 7, in the manner of using a pair of pliers, to force the jaw ends together, the cutting edge 15, 16, 17, or the like, cuts out a piece of said fruit, vegetable, and the like, in the predetermined pattern.

While the invention has been described by means of specific examples and in specific embodiments, I do not wish to be limited thereto, for obvious modifications will occur to those skilled in the art without departing from the spirit and scope of the invention.

I claim:

1. A food decorating instrument for cutting pieces of fruit, vegetables, and the like, in a predetermined pattern, said food decorating instrument comprising first and second arms pivotally affixed to each other by a pivot pin in the manner of a pair of pliers, each of said arms having a jaw end in the area of the pivot pin and a handle end spaced from the pivot pin;

spring means mounted on the arms urging the jaw ends of the first and second arms apart;

an internally threaded bore formed in the jaw end of the first arm, said bore opening from a surface of said first arm facing the second arm and extending a predetermined distance into said first arm;

a plate-like member affixed to the jaw end of the second arm at a surface facing the first arm; and a mold member having a base plate with spaced opposite surfaces, an externally threaded pin extending substantially perpendicularly from one of the surfaces of the base plate and a cutting edge having a predetermined pattern extending substantially perpendicularly from the opposite surface of the base plate whereby when the mold member is removably affixed to the first arm by removably threadedly coupling the pin thereof in the bore of the first arm and a slice of fruit, vegetable, and the like, is interposed between the jaw ends and manual pressure is applied to the handle ends to force the jaw ends together the cutting edge cuts out a piece of said fruit, vegetable, and the like in the predetermined pattern.

* * * * *